United States Patent
Lim et al.

(10) Patent No.: US 11,072,838 B2
(45) Date of Patent: *Jul. 27, 2021

(54) METHOD AND DEVICE FOR MAGNETIC DOMAIN REFINEMENT OF ORIENTED ELECTRICAL STEEL PLATE

(71) Applicant: POSCO, Pohang-si (KR)

(72) Inventors: Seung Ho Lim, Pohang-si (KR); Do Ryun Lee, Pohang-si (KR); Jin Ho Kim, Pohang-si (KR); Myung Sik Chun, Pohang-si (KR); Gyoo Taek Lee, Pohang-si (KR); Seong Cheol Hong, Pohang-si (KR)

(73) Assignee: POSCO, Pohang-si (KR)

( * ) Notice: Subject to any disclaimer, the term of this patent is extended or adjusted under 35 U.S.C. 154(b) by 257 days.

This patent is subject to a terminal disclaimer.

(21) Appl. No.: 16/072,167

(22) PCT Filed: Dec. 26, 2016

(86) PCT No.: PCT/KR2016/015262
§ 371 (c)(1),
(2) Date: Jul. 23, 2018

(87) PCT Pub. No.: WO2017/126814
PCT Pub. Date: Jul. 27, 2017

(65) Prior Publication Data
US 2019/0032167 A1    Jan. 31, 2019

(30) Foreign Application Priority Data

Jan. 22, 2016   (KR) .................. 10-2016-0008380

(51) Int. Cl.
*C21D 9/56*     (2006.01)
*B23K 26/08*    (2014.01)
(Continued)

(52) U.S. Cl.
CPC ............... *C21D 9/56* (2013.01); *B23K 26/03* (2013.01); *B23K 26/048* (2013.01); *B23K 26/08* (2013.01);
(Continued)

(58) Field of Classification Search
None
See application file for complete search history.

(56) References Cited

U.S. PATENT DOCUMENTS 4,840,304 A * 6/1989 Sato
5,970,729 A * 10/1999 Yamamoto
(Continued)

FOREIGN PATENT DOCUMENTS

| CN | 202007259 U | 10/2011 |
| CN | 202226886 U | 5/2012 |

(Continued)

OTHER PUBLICATIONS

Machine translation of JP02-22423A. (Year: 1990).*
(Continued)

*Primary Examiner* — Xiaowei Su
(74) *Attorney, Agent, or Firm* — Morgan, Lewis & Bockius LLP

(57) ABSTRACT

To optimize equipment and processes to enhance magnetic domain refinement efficiency and to enhance workability to improve processing capability, a method of refining a magnetic domain of a grain-oriented electrical steel plate includes zigzag controlling for transferring the steel plate without being inclined in right and left directions along a production line center, steel plate support roll position adjusting for controlling a position of the steel plate in up and down directions while supporting the steel plate, laser beam irradiating for irradiating a laser beam to a surface of the steel plate to melt the steel plate to form a groove in the
(Continued)

surface of the steel plate, and removing for absorbing and removing radiant heat due to reflection of the laser beam irradiated to the surface of the steel plate during the laser beam irradiating.

10 Claims, 5 Drawing Sheets

(51) Int. Cl.

| | | |
|---|---|---|
| B23K 26/14 | (2014.01) | |
| C21D 6/00 | (2006.01) | |
| C21D 10/00 | (2006.01) | |
| B23K 26/354 | (2014.01) | |
| B23K 26/364 | (2014.01) | |
| C21D 8/12 | (2006.01) | |
| B23K 26/142 | (2014.01) | |
| B23K 37/047 | (2006.01) | |
| B23K 26/12 | (2014.01) | |
| B23K 26/03 | (2006.01) | |
| B23K 26/40 | (2014.01) | |
| B23K 26/359 | (2014.01) | |
| B23K 26/04 | (2014.01) | |
| B23K 26/082 | (2014.01) | |
| B23K 26/70 | (2014.01) | |
| B23K 103/04 | (2006.01) | |
| B23K 101/16 | (2006.01) | |

(52) U.S. Cl.
CPC ...... *B23K 26/0821* (2015.10); *B23K 26/0846* (2013.01); *B23K 26/123* (2013.01); *B23K 26/127* (2013.01); *B23K 26/14* (2013.01); *B23K 26/142* (2015.10); *B23K 26/354* (2015.10); *B23K 26/359* (2015.10); *B23K 26/364* (2015.10); *B23K 26/40* (2013.01); *B23K 26/703* (2015.10); *B23K 37/047* (2013.01); *C21D 6/008* (2013.01); *C21D 8/12* (2013.01); *C21D 8/1277* (2013.01); *C21D 8/1294* (2013.01); *C21D 10/00* (2013.01); *B23K 2101/16* (2018.08); *B23K 2103/04* (2018.08)

(56) References Cited

U.S. PATENT DOCUMENTS

| | | | |
|---|---|---|---|
| 2009/0200280 | A1 | 8/2009 | Piantoni et al. |
| 2013/0139932 | A1* | 6/2013 | Sakai .................. C21D 8/1272 148/565 |
| 2014/0202213 | A1* | 7/2014 | Park .................. B23K 26/704 65/348 |
| 2019/0054570 | A1* | 2/2019 | Hong .................. C21D 8/12 |
| 2019/0062866 | A1* | 2/2019 | Hong .................. C21D 8/12 |

FOREIGN PATENT DOCUMENTS

| | | |
|---|---|---|
| CN | 104752278 A | 7/2015 |
| JP | S57-002252 B2 | 1/1982 |
| JP | S57-203720 A | 12/1982 |
| JP | S58-005968 B2 | 2/1983 |
| JP | S61-157631 A | 7/1986 |
| JP | H02-22423 A | 1/1990 |
| JP | H05-022547 A | 3/1993 |
| JP | H06-57857 B2 | 8/1994 |
| JP | H07-072300 B2 | 8/1995 |
| JP | 2002-361450 A | 12/2002 |
| JP | 2004-351447 A | 12/2004 |
| JP | 2012-087332 A | 5/2012 |
| JP | 2012-162757 A | 8/2012 |
| JP | 5696380 B2 | 4/2015 |
| KR | 20-0204905 Y1 | 12/2000 |
| KR | 10-2012-0049906 A | 5/2012 |
| KR | 10-2012-0073913 A | 7/2012 |
| KR | 10-2012-0073914 A | 7/2012 |
| KR | 10-2014-0021915 A | 2/2014 |
| KR | 10-1395800 B1 | 5/2014 |
| KR | 10-2014-0087126 A | 7/2014 |
| KR | 10-2014-0094354 A | 7/2014 |
| KR | 10-2015-0000927 A | 1/2015 |
| KR | 10-2015-0076894 A | 4/2015 |

OTHER PUBLICATIONS

Japanese Office Action dated Aug. 20, 2019 issued in Japanese Patent Application No. 2018-538188.
Extended European Search Report issued in European Application No. 16886657.2 dated Oct. 17, 2018.
International Search Report dated Mar. 29, 2017 issued in International Patent Application No. PCT/KR2016/015262 (with English translation).
Chinese Office Action dated Jul. 2, 2019 issued in Chinese Patent Application No. 201680079803.8.

* cited by examiner

[FIG. 2]
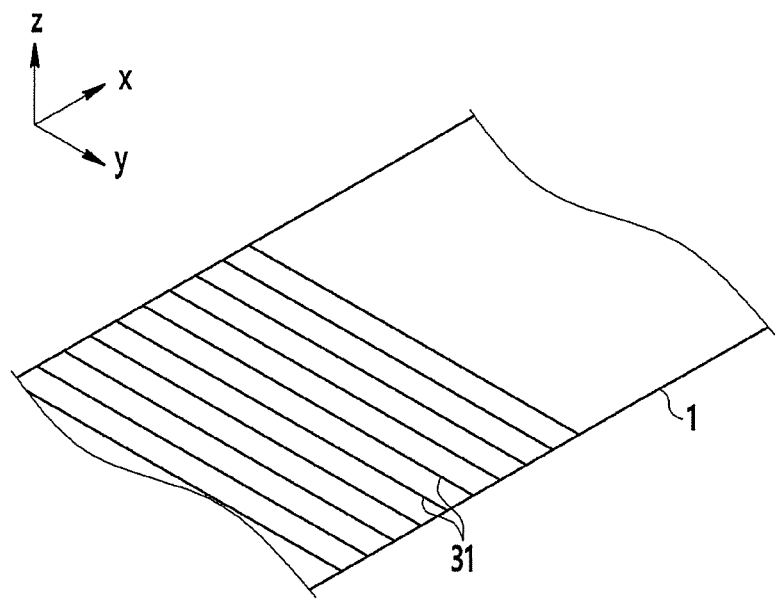
[FIG. 3]
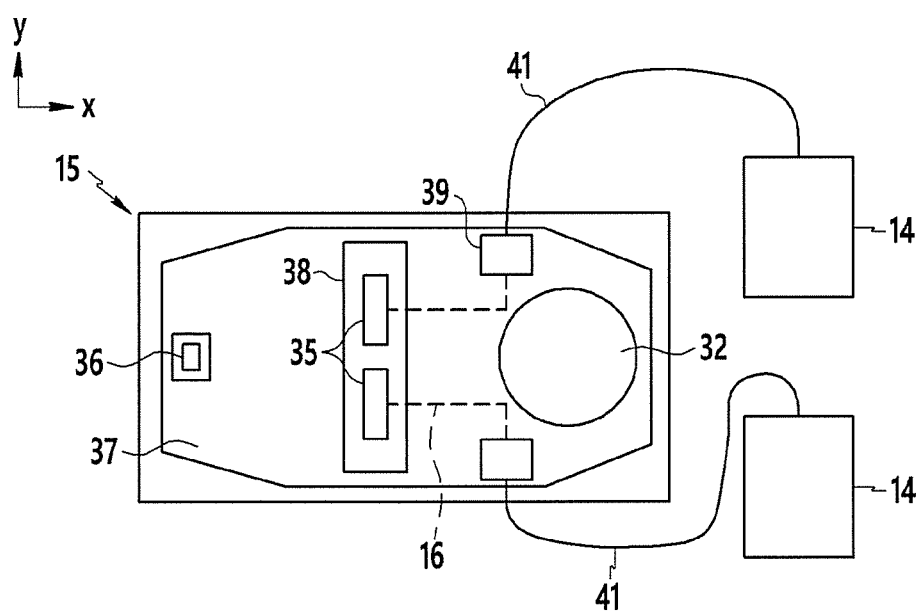

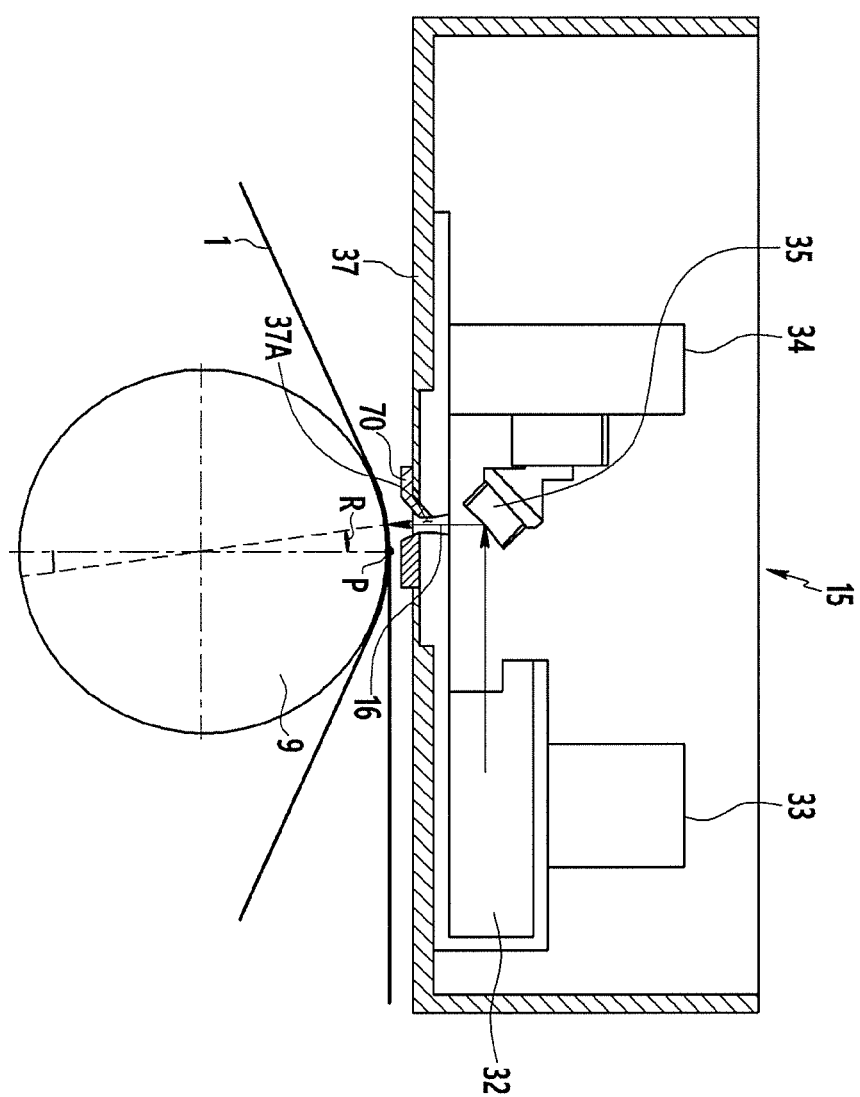

[FIG. 5]
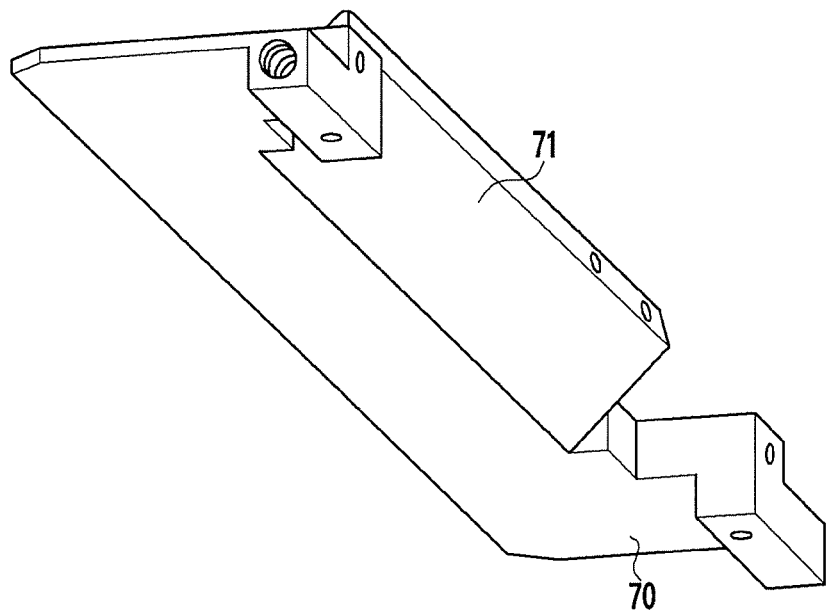
[FIG. 6]
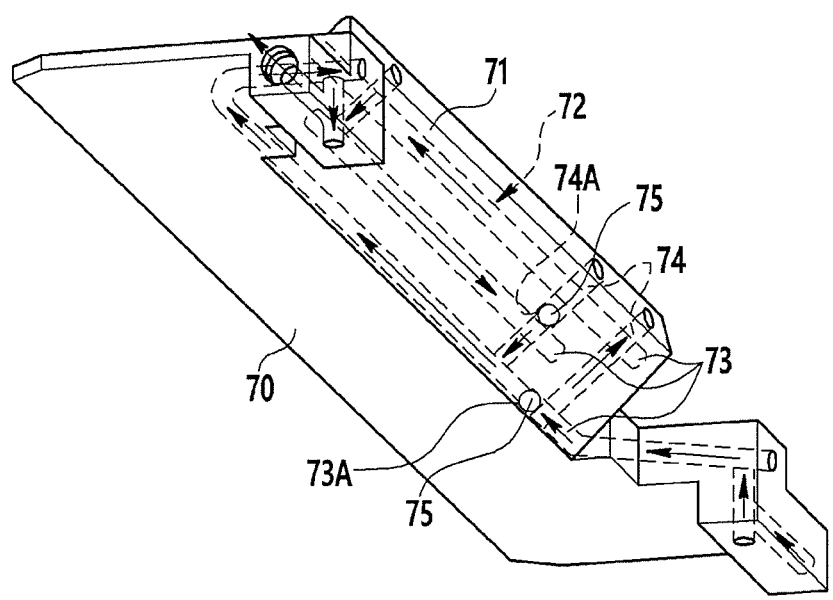

[FIG. 7]
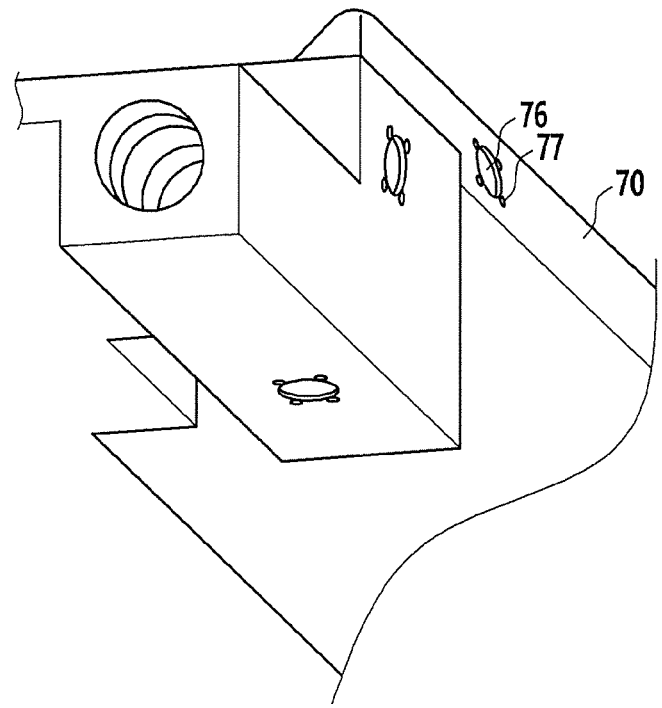
[FIG. 8]
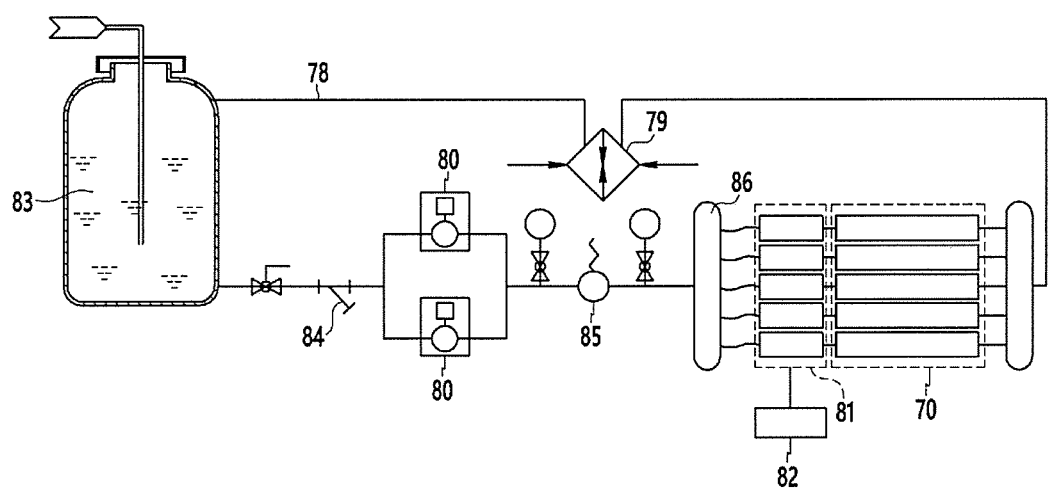

METHOD AND DEVICE FOR MAGNETIC DOMAIN REFINEMENT OF ORIENTED ELECTRICAL STEEL PLATE

CROSS REFERENCE

This patent application is the U.S. National Phase under 35 U.S.C. § 371 of International Application No. PCT/KR2016/015262, filed on Dec. 26, 2016, which claims the benefit of Korean Patent Application No. 10-2016-0008380, filed on Jan. 22, 2016, the entire contents of each are hereby incorporated by reference.

TECHNICAL FIELD

The present invention relates to a method and device for refining a magnetic domain of a grain-oriented electrical steel plate, for permanently performing magnetic domain refinement on a steel plate by irradiating a grain-oriented electrical steel plate with a laser beam.

BACKGROUND ART

For example, to reduce power loss of an electronic device such as a transformer and to improve efficiency of the electronic device, there is a need for a grain-oriented electrical steel plate with magnetic characteristics such as low iron loss and high magnetic flux density.

To reduce iron loss of a grain-oriented electrical steel plate, disclosed is a technology of reducing iron loss using a mechanical method or by irradiating a surface of the steel plate with a laser beam to refine a magnetic domain in a vertical direction with respect to a rolling direction, thereby reducing iron loss.

A magnetic domain refining method may broadly classified into a temporary magnetic domain refining method and a permanent magnetic domain refining method according to whether an effect of enhancing refinement of a magnetic domain is maintained after annealing for removing stress is performed.

The temporary magnetic domain refining method is disadvantageous in that an effect of refinement of a magnetic domain is lost after annealing for removing stress is performed. In the temporary magnetic domain refining method, a magnetic domain is refined by forming a local compress stress portion on the surface of the steel plate. However, in this method, an insulating coating layer of the surface of the steel plate is damaged and, thus, re-coating is required and magnetic domain refinement needs to be processed in an intermediate process instead of a final product, thereby disadvantageously increasing manufacturing costs.

In the permanent magnetic domain refining method, an effect of improving iron loss characteristics is also maintained after heat treatment is performed. For the permanent magnetic domain refinement processing, a technology using an etching method, a roll method, or a laser method is mainly used. It is disadvantageous that the etching method is not environmentally friendly in that it is difficult to control a depth or a width for forming a groove, it is difficult to ensure the characteristics of iron loss of a final product, and an acid solution is used. The method using a roll is disadvantageous in terms of stability, reliability, and complex processes with respect to mechanical processing.

In a method of permanently refining a magnetic domain of a steel plate using a laser, a magnetic domain may be refined by irradiating a laser beam to the surface of the steel plate to form a melting groove in the surface of the steel plate in a state in which the steel plate is supported and tension is adjusted. As such, there is a need to enhance and optimize as effective as possible process to reduce iron loss of an electrical steel plate and to increase magnetic flux density while high speed processing is possible in refinement of a magnetic domain using a laser.

DISCLOSURE

Technical Problem

The present invention has been made in an effort to provide a method and device for refining a magnetic domain of a grain-oriented electrical steel plate having advantages of optimizing equipment and processes to enhance magnetic domain refinement efficiency and enhancing enhance workability to improve processing capability.

An exemplary embodiment of the present invention provides a method and device for refining a magnetic domain of a grain-oriented electrical steel plate, for preventing an optical system from being damaged due to reflection and radiant heat of a laser beam.

Another embodiment of the present invention provides a method and device for refining a magnetic domain of a grain-oriented electrical steel plate, for more effectively removing pollutant such as hill up and spatter formed via laser beam irradiation.

Yet another embodiment of the present invention provides a method and device for refining a magnetic domain of a grain-oriented electrical steel plate, for providing an optimum operation environment required for a process.

Technical Solution

According to an embodiment of the present invention, a method of refining a magnetic domain of a grain-oriented electrical steel plate includes steel plate support roll position adjusting for controlling a position of the steel plate in up and down directions while supporting the steel plate transferred in a production line, laser beam irradiating for irradiating a laser beam to a surface of the steel plate to melt the steel plate to form a groove in the surface of the steel plate, and removing for absorbing and removing radiant heat due to reflection of the laser beam irradiated to the surface of the steel plate during the laser beam irradiating.

The removing may include heat-exchanging and absorbing radiant heat of a laser beam through a cooling block installed below an optical system for irradiating a laser beam corresponding to a reflected position of a laser beam reflected by the steel plate, and circulating a coolant in the cooling block to maintain cooling temperature of the cooling block.

The removing may further include detecting a flow rate of the coolant supplied to the cooling block, and controlling driving of a laser oscillator when the fed flow rate of the coolant is abnormal.

The laser beam irradiating may include irradiating the laser beam at a position spaced apart from a center of a steel plate support roll from a reference point, which is determined as a laser beam irradiation position when an irradiation direction of a laser beam passes through a center axis of the steel plate support roll with respect to the surface of the steel plate transferred to contact the surface of the steel plate support roll in a circular arc form, along an external circumferential surface at a predetermined angle.

The laser beam irradiating may include irradiating a laser beam in a spacing range of 3 to 7° along an external circumferential surface at a center of the steel plate support roll with respect to the reference point.

The method may further include setting and maintaining for setting and maintaining an internal operation environment of a laser room in which laser beam irradiation is performed.

The setting and maintaining may include isolating an internal portion of the laser room from the outside to prevent external pollutant from being introduced, and controlling temperature, pressure, and humidity inside the laser room.

The method may further include tension controlling for applying tension to the steel plate to maintain the steel plate in a flat state.

The method may further zigzag controlling for transferring the steel plate without being inclined in right and left directions along a production line center.

The method may further include post processing for removing hill up and spatter formed on the surface of the steel plate via the laser beam irradiation.

The post processing may include brushing for removing hill up and spatter attached on the surface of the steel plate by a brush roll.

The post processing may further include cleaning for additionally removing hill up and spatter remaining on the surface of the steel plate via electrolysis reaction between the steel plate and an alkaline solution, and filtering for filtering impurities included in an alkaline solution and removed from the steel plate in the cleaning from the alkaline solution.

The zigzag controlling may include zigzag degree measuring for measuring a degree by which a central position of the steel plate deviates from a production line center in a width direction, and zigzag degree controlling for rotating and moving an axis of a steering roll to adjust a direction in which the steel plate is transferred according to a zigzag degree of the steel plate, measured in the zigzag degree measuring.

The zigzag degree controlling may include controlling a zigzag degree within ±1 mm.

The tension controlling may include steel plate tension applying for applying tension to the steel plate by the tension bridle roll, a steel plate measuring for measuring tension of the steel plate on which the steel plate tension applying is applied, and steel plate tension controlling for adjusting speed of the tension bridle roll according to the steel plate tension measured in the steel plate tension measuring to control the tension of the steel plate.

The steel plate support roll position adjusting may include steel plate supporting for supporting the steel plate positioned in the laser beam irradiating by a steel plate support roll, brightness measuring for measuring brightness of flame generated in the laser beam irradiating on the steel plate in the laser beam irradiating, and plate support roll position controlling for adjusting a position of the steel plate support roll by a steel plate support roll position control system according to brightness of flame measured in the bright measuring to position the steel plate in a depth of focus of the laser beam.

The laser beam irradiating may include laser beam irradiating and energy transferring for irradiating a laser beam to the surface of the steel plate to form a groove having an upper width within 70 μm, a lower width within 10 μm, and a depth of 3 to 30 μm by an optical system that receives the laser beam emitted from the laser beam oscillator and, simultaneously, transferring laser beam energy density in the range of 1.0 to 5.0 J/mm² required to melt a steel plate to the steel plate to produce a re-solidified portion accumulating on an internal wall of the groove of a melted portion during laser beam irradiation.

The laser beam irradiating may include laser beam oscillation controlling for controlling a laser oscillator to oscillate a laser beam in an on state under a normal working condition and controlling the laser oscillator in an off state when a zigzag degree is equal to or greater than 15 mm.

The laser irradiating may include oscillating a single mode consecutive wave laser beam by the laser oscillator.

The laser irradiating may include controlling laser scanning speed to adjust an interval between laser beam irradiation lines to 2 to 30 mm in a rolling direction by an optical system.

The laser irradiating may further include angle changing for changing an angle of an irradiation line of the laser beam irradiated to the surface of the steel plate.

The angle changing may include changing the angle of the irradiation line of the laser beam in a width direction of the steel plate to a range of ±4°.

The laser beam irradiating may further include preventing reflected light and scattered light of a laser beam from being introduced into an optical system of the laser beam irradiation equipment.

The laser beam irradiating may further include dust collecting for absorbing and removing fume and melted iron generated during the laser beam irradiating. The dust collecting may include spraying for spraying compressed dry air into a groove of the steel plate to remove melted iron remaining in the groove.

According to another embodiment of the present invention, a device for refining a magnetic domain of a grain-oriented electrical steel plate includes steel plate support roll position adjusting equipment configured to control a position of the steel plate in up and down directions while supporting the steel plate transferred in a production line, laser beam irradiation equipment configured to irradiate a laser beam to a surface of the steel plate to melt the steel plate to form a groove in the surface of the steel plate, and an absorption portion configured to absorb and remove radiant heat due to reflection of the laser beam irradiated to the surface of the steel plate.

The absorption portion may include a cooling block installed below an optical system of the laser beam irradiation equipment to corresponding to a reflected position of the laser beam reflected by the steel plate and configured to absorb radiant heat of a reflected laser beam via heat exchange.

The absorption portion may further includes a cooling path formed in the cooling block and a supply portion configured to circulate and supply the coolant to the cooling block through a supply pipe connected to the cooling path.

The cooling block may be installed below an optical system along a surrounding portion of the opening through which a laser beam is passed.

The cooling block may be inclined in such a way that a front surface to which a reflected light beam of a laser beam faces toward an irradiation direction of the reflected light beam.

The cooling block may form a chemical vapor coating layer to prevent scattered melted iron from being attached to the surface.

The cooling path of the cooling block may include a plurality of paths formed in a straight line through an external surface of the cooling block, and a plug configured to block a path in the path to connect the paths in one direction at an intersection between the paths and formed in a zigzag form.

The plug may be fixedly installed to the cooling block via a cogging of the cooling block.

The supply portion may include a heat exchanger installed on a coolant circulation line, a supply pump configured to supply the coolant passed through the heat exchanger, a flow switch configured to detect a fed flow rate of the coolant introduced into the cooling block along the circulation line according to driving of the supply pump, and a control circuit configured to control driving of the laser oscillator of the optical system based on a detected value of the flow switch.

The laser beam irradiation equipment may irradiate the laser beam at a position spaced apart from a center of a steel plate support roll from a reference point, which is determined as a laser beam irradiation position when an irradiation direction of a laser beam passes through a center axis of the steel plate support roll with respect to the surface of the steel plate transferred to contact the surface of the steel plate support roll in a circular arc form, along an external circumferential surface at a predetermined angle.

The laser beam irradiation equipment may irradiate a laser beam in a spacing range of 3 to 7° along an external circumferential surface at a center of the steel plate support roll with respect to the reference point.

The device may further include a laser room configured to isolate the steel plate support roll position adjusting equipment and the laser beam irradiation equipment from the outside to provide an operation environment for laser beam irradiation.

The laser room may include an over pressure device configured to accommodate the laser beam irradiation equipment and the steel plate support roll position control equipment to form an internal space to be isolated from the outside, including an inlet and an outlet at opposite sides in a transferred direction of the steel plate, and formed therein to increase internal pressure of the laser room compared with external pressure, an optical system lower frame configured to separate an upper space in which an optical system of the laser beam irradiation equipment is positioned, from a lower space in which the steel plate is passed, and an isothermal-isohumidity controller configured to control temperature and humidity inside the laser room.

The device may further include tension control equipment configured to apply tension to the steel plate to maintain the steel plate in a flat state.

The device may further include zigzag control equipment configured to transfer the steel plate without being inclined in right and left directions along a production line center.

The device may further include post-processing equipment configured to remove hill up and spatter formed on the surface of the steel plate.

The post-processing equipment may include a brush roll disposed at a rear end of the laser room and configured to remove hill up and spatter of a surface of the steel plate.

The post-processing equipment may further include a cleaning unit disposed at a rear end of the brush roll to additionally removing the hill up and spatter remaining on the surface of the steel plate via electrolysis reaction between the steel plate and an alkaline solution and a filter unit connected to the cleaning unit to filter impurities included in the alkaline solution of the cleaning unit from the alkaline solution.

The zigzag control equipment may include steering rolls for changing a transferring direction of the steel plate, a zigzag measuring sensor for measuring a degree (zigzag degree) by which a central position of the steel plate deviates from a production line center in a width direction, and a strip center position control system for rotating and moving an axis of the steering rolls according to the output value of the zigzag measuring sensor to adjust a direction in which the steel plate is transferred.

The tension control equipment may include tension bridle rolls for guiding transferring while applying tension to the steel plate, a steel plate tension measuring sensor for measuring tension of the steel plate passed through the tension bridle rolls, and a strip tension control system for adjusting speed of the tension bridle rolls depending on tension of the steel plate measured by the steel plate tension measuring sensor.

The steel plate support roll position adjusting equipment may include the steel plate support roll for supporting the steel plate at the laser beam irradiation position, a brightness measuring sensor for measuring brightness of flame generated when a laser beam is irradiated to the steel plate by the laser beam irradiation equipment, and a steel plate support roll position control system for controlling a position of the steel plate support roll depending on the brightness of the flame measured by the brightness measuring sensor.

The laser beam irradiation equipment may include a laser oscillator configured to oscillate a consecutive wave laser beam and an optical system configured to irradiate the laser beam oscillated by the laser beam oscillator to the surface of the steel plate to form a groove having an upper width within 70 μm, a lower width within 10 μm, and a depth of 3 to 30 μm and, simultaneously, to transfer laser beam energy density in the range of 1.0 to 5.0 J/mm$^2$ required to melt a steel plate to the steel plate to produce a re-solidified portion accumulating on an internal wall of the groove of a melted portion during laser beam irradiation.

The laser beam irradiation equipment may further include a laser oscillator controller configured to control a laser oscillator to oscillate a laser beam in an on state under a normal working condition and to control the laser oscillator in an off state when a zigzag degree is equal to or greater than 15 mm.

The laser oscillator may oscillate a single mode consecutive wave laser beam.

The optical system may control laser scanning speed to adjust an interval between laser beam irradiation lines to 2 to 30 mm in a rolling direction.

The laser beam irradiation equipment may be configured in such a way that an optical system configured to irradiate a laser beam to the steel plate is rotatable by a driver and to be rotated with respect to the steel plate to change an irradiation angle of the laser beam in a width direction of the steel plate.

The laser beam irradiation equipment may further include a shield configured to prevent scattered light and heat of a laser beam from being introduced into the optical system.

The laser beam irradiation equipment may further include melted iron removal equipment for removing fume and spatter that are generated via irradiation of a laser beam to the steel plate.

The melted iron removal equipment may include an air knife for spraying compressed dry air into a groove of the steel plate to remove melted iron remaining in the groove and dust collection hoods for absorbing and removing fume and melted iron.

Advantageous Effects

As described above, according to the present exemplary embodiment, even if the steel plate is transferred at high speed equal to or greater than 2 m/sec, a magnetic domain refinement process may be stably performed using a laser and, thus, a iron loss improvement rate before and after heat treatment of the steel plate may be ensured by 5% or greater and 10% or greater, respectively.

An optical system may be prevented from being heated by radiant heat due to reflection of a laser beam, thereby being prevented from being thermally deformed and damaged.

A cooling block may have a simplified structure and may be easily manufactured and, thus, may be easily installed and repaired below an optical system even in a narrow space between the steel plate and the optical system.

Heat crack of the cooling block may be minimized and scattered melted iron melted by a laser beam may be prevented from being fused to the cooling block.

A coolant flow may be continuously detected to control a laser oscillator to prevent an error in terms of magnetic domain refinement processing due to degraded performance of the optical system.

The magnetic domain refinement efficiency may be enhanced and workability may be enhanced to increase magnetic domain refinement capability.

Pollutants such as hill up and spatter formed via laser beam irradiation may be more effectively removed to enhance quality of products.

An optimum operation environment required for processes and, thus, high-quality products may be massively produced.

DESCRIPTION OF THE DRAWINGS

FIG. 2 illustrates a steel plate on which magnetic domain refinement is processed according to the present exemplary embodiment.

FIG. 3 is a schematic diagram showing a structure of an optical system of laser beam irradiation equipment including an absorption portion according to the present exemplary embodiment.

FIG. 4 is a schematic diagram showing a structure of a cooling block installed below an optical system according to the present exemplary embodiment.

FIG. 5 is a perspective view showing a cooling block according to the present exemplary embodiment.

FIG. 6 is a schematic diagram showing a cooling path inside a cooling block according to the present exemplary embodiment.

FIG. 7 is a schematic diagram showing a plug fixing structure of a cooling block according to the present exemplary embodiment.

FIG. 8 is a schematic diagram showing a structure in which a coolant is supplied to a cooling block according to the present exemplary embodiment.

MODE FOR INVENTION

Figure 1:
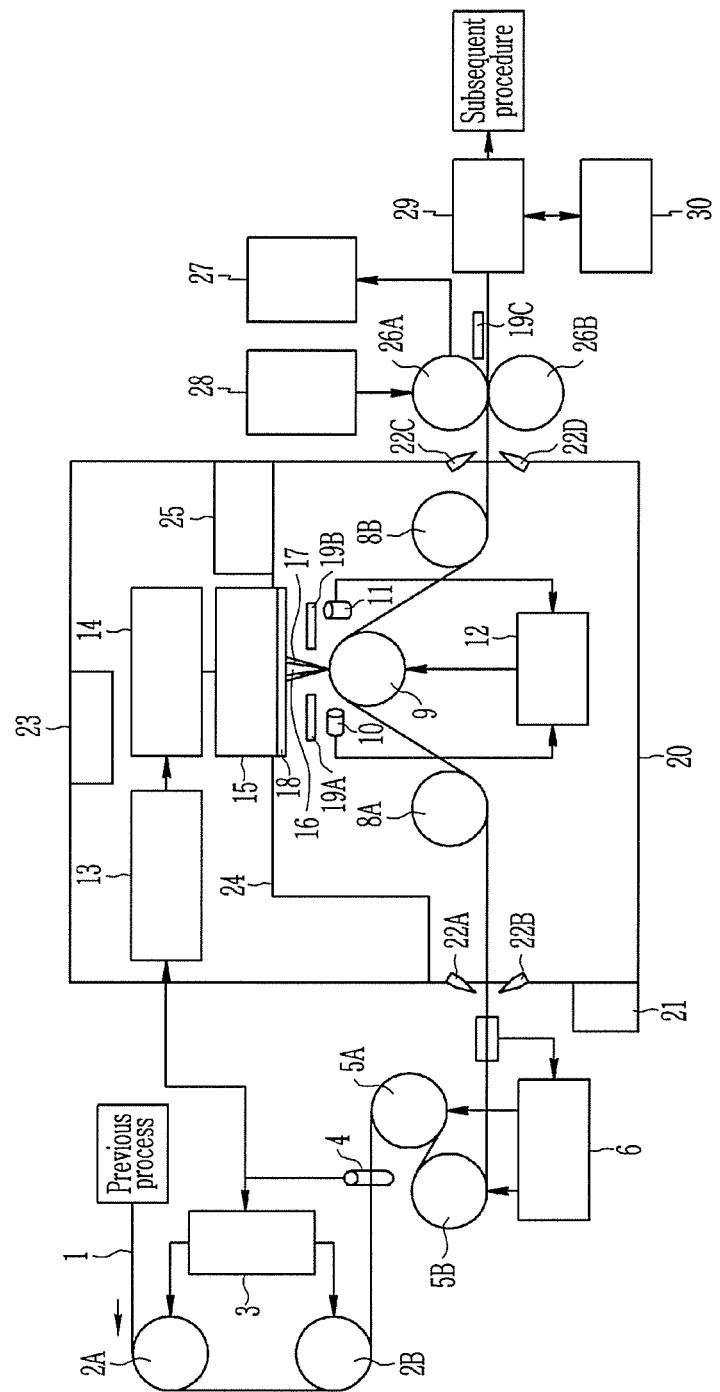
FIG. 1 is a schematic diagram showing a structure of a magnetic domain refining method of a grain-oriented electrical steel plate according to the present exemplary embodiment.

The technical terms used hereinafter is only for describing a specific exemplary embodiment and is not intended to limit the present invention. As used herein, the singular forms are intended to include the plural forms as well, unless the context clearly indicates otherwise. It will be further understood that the terms "comprises" when used in this specification, specify the presence of stated features, regions, integers, steps, operations, elements, and/or components, but do not preclude the presence or addition of other features, regions, integers, steps, operations, elements, components, and/or groups thereof.

Hereinafter, exemplary embodiments of the present invention are described in detail so as for those of ordinary skill in the art to easily implement with reference to the accompanying drawings.

The invention may be embodied in many different forms and these embodiments are provided so that this disclosure will be thorough and complete, and will fully convey the concept of the invention to those skilled in the art. Accordingly, as those skilled in the art would realize, the embodiments may be modified in various different ways, all without departing from the spirit or scope of the present invention.

Hereinafter, equipment for permanent magnetic domain refinement of a grain-oriented electrical steel plate used in an iron core of a transformer or the like is exemplified according to the present exemplary embodiment of the present invention.

FIG. 1 is a schematic diagram showing a magnetic domain refining device of a grain-oriented electrical steel plate according to the present exemplary embodiment. FIG. 2 illustrates a steel plate on which magnetic domain refinement is processed according to the present exemplary embodiment. Hereinafter, in FIG. 2, a rolling direction or a steel plate transferring direction refers to the x-axis direction, a width direction refers to a direction perpendicular to the rolling direction and the y-axis direction in FIG. 2, and a width refers to a length of a steel plate in the y-axis direction. In FIG. 2, a reference numeral 31 refers to an irradiation line that is continuously formed in a surface of the steel plate 1 by digging the surface in the form of a groove by a laser beam.

Referring to FIG. 1, the device for refining a magnetic domain of a grain-oriented electrical steel plate according to the present exemplary embodiment may stably perform permanent magnetic domain refinement processing even if the steel plate 1 is transferred at high speed of 2 m/s or more.

The device for refining a magnetic domain according to the present exemplary embodiment may include a steel plate support roll position adjusting equipment for controlling a position of steel plate in up and down directions while supporting the steel plate 1 transferred along a production line, laser beam irradiation equipment for irradiating a laser beam to melt a steel plate and forming a groove in the surface of the steel plate, and an absorption portion for absorbing and removing radiant heat based on reflection of the laser beam irradiated onto the laser beam irradiated to the surface of the steel plate.

The device for refining a magnetic domain may further include a laser room 20 that isolates the steel plate support roll position adjusting equipment and the laser beam irradiation equipment from the outside to provide an operation environment for irradiating a laser beam.

The device for refining a magnetic domain may further include tension control equipment for applying tension to a steel plate to maintain the steel plate in a flat state without sagging.

The device for refining a magnetic domain may further include zigzag control equipment for transferring the steel plate without being inclined in right and left directions along a production line center.

The device for refining a magnetic domain may further include post-processing equipment for removing hill up and spatter which are formed on the surface of the steel plate along with laser beam irradiation.

The hill up refers to a portion formed by accumulating melted iron on a steel plate at opposite sides of a groove by a predetermined height or more when a laser beam is irradiated to the surface of the steel plate to form the groove. The spatter refers to melted iron that is generated by irradiating a laser beam and is solidificated on the surface of the steel plate.

The zigzag control equipment may include steering rolls 2A and 2B for changing a transferring direction of the steel plate 1, a zigzag measuring sensor 4 for measuring a degree (zigzag degree) by which a central position of the steel plate 1 deviates from a production line center in a width direction, and a strip center position control system 3 for calculating a detection signal of the zigzag measuring sensor 4 and rotating and moving an axis of the steering rolls 2A and 2B to adjust a direction in which the steel plate 1 is transferred.

The zigzag measuring sensor 4 may be disposed at a rear end of the steering roll 2B and may detect an actual zigzag degree of the steel plate passed through the steering roll in real time.

The zigzag control equipment may allow the steel plate to be straightly transferred along a production line center without being inclined to right and left directions to form the groove in a surface of the steel plate over an entire width of the steel plate.

The zigzag control equipment may measure a zigzag degree of the steel plate by the zigzag measuring sensor 4 in a previous process of formation of a groove in the surface of the steel plate via laser beam irradiation. The value measured by zigzag measuring sensor 4 may be output to the strip center position control system and the strip center position control system may calculate an output value of the zigzag measuring sensor and may rotate and transfer axes of the steering rolls 2A and 2B depending on the calculated zigzag degree. As such, the steering rolls 2A and 2B may be rotated and transferred to adjust a direction of moving the steel plate that is wound around the steering roll and is transferred. Accordingly, a zigzag degree of the steel plate may be controlled within ±1 mm.

The tension control equipment may include tension bridle rolls (TBRs) 5A and 5B for guiding transferring while applying tension with predetermined amplitude to the steel plate 1, a steel plate tension measuring sensor 7 for measuring tension of the steel plate 1 passed through the tension bridle rolls, and a strip tension control system 6 for adjusting speed of the tension bridle rolls 5A and 5B depending on tension of the steel plate 1 measured by the steel plate tension measuring sensor 7.

The steel plate tension measuring sensor 7 may be disposed at a rear end of the tension bridle roll 5B and may measure actual tension of the steel plate to which tension is applied through the tension bridle roll 5B in real time.

According to the present exemplary embodiment, tension of the steel plate may be set to prevent a wave end due to an excessive amplitude of tension while planarizing a surface shape of the steel plate at a laser beam irradiation position of the laser beam irradiation equipment.

The tension control equipment may adjust speed of the tension bridle rolls (TBRs) 5A and 5B by the strip tension control system 6 depending on tension of the steel plate measured by the steel plate tension measuring sensor 7 to perform work with tension of the steel plate within a predetermined range.

Accordingly, the tension control equipment may control tension error of the steel plate 1 within the predetermined range and may apply the tension to the steel plate.

The steel plate passed through the tension control equipment may be introduced into the laser room 20, may be magnetic domain-refined through the steel plate support roll position adjusting equipment and the laser beam irradiation equipment and, then, may be transferred out of the laser room 20. The laser room is re-described below.

According to the present exemplary embodiment, a steel plate support roll 9 may be disposed immediately below the laser beam irradiation equipment in the laser room 20 and deflector rolls 8A and 8B may be disposed to face each other across the steel plate support roll.

A transferring direction of the steel plate 1 may be changed toward the steel plate support roll 9 by the deflector rolls 8A and 8B. The transferring direction of the steel plate 1 may be changed toward the steel plate support roll 9 through the deflector roll 8A to contact the steel plate support roll 9 and, then, may be re-changed toward the deflector roll 8B to be transferred through the deflector roll 8B.

The steel plate 1 may be wound along the steel plate support roll 9 in a circular arc form by the deflector roll and may be transferred to surface contact the steel plate support roll. To minimize a variation in a laser beam focal distance due to vibration and wave of the steel plate during laser beam irradiation, the steel plate needs to be transferred to sufficiently surface-contact the steel plate support roll and, in this state, a laser beam needs to be irradiated to the steel plate that is transferred along the steel plate support roll. According to the present exemplary embodiment, as described above, as the surface of the steel plate contacts the steel plate support roll, a laser beam may be accurately irradiated to the steel plate.

The steel plate support roll position adjusting equipment may include the steel plate support roll 9 for supporting the steel plate 1 at the laser beam irradiation position of the laser beam irradiation equipment, a brightness measuring sensor 10 for measuring brightness of flame generated when a laser beam is irradiated to the steel plate 1 by the laser beam irradiation equipment, and a steel plate support roll (SPR) position control system 12 for controlling a position of the steel plate support roll 9 depending on the brightness of the flame measured by the brightness measuring sensor 10.

The steel plate support roll position adjusting equipment may support the steel plate 1 at the laser beam irradiation position by the steel plate support roll 9 and a position of the steel plate support roll 9 may be adjusted in up and down directions as a whole to achieve a best state of brightness of flame generated while a laser beam is irradiated to the steel plate to allow the steel plate to be positioned in a depth of focus with high laser steel plate irradiation efficiency. The brightness of flame generated while a laser beam is irradiated to the steel plate may be measured using the brightness measuring sensor 10.

According to the present exemplary embodiment, the steel plate support roll position adjusting equipment may further include a distance measuring sensor 11 for measuring an actual distance between the surface of the steel plate and an optical system of the laser beam irradiation equipment. The SPR position control system 12 may calculate the brightness of the flame measured by the brightness measuring sensor 10 and the distance between the steel plate and the optical system actually measured from distance measuring sensor 11 and may more accurately control a position of the steel plate support roll 9.

The zigzag control equipment, the tension control equipment, and the steel plate support roll position adjusting equipment may make a steel plate condition at a laser beam irradiation position for accurately forming a laser groove in the steel plate by the laser beam irradiation equipment. A central position of the steel plate at the laser beam irradiation position needs to be positioned in a production line center and a distance of the steel plate from the optical system needs to be maintained as a predetermined value.

The laser beam irradiation equipment may include a laser oscillator controller 13, a laser oscillator 14 for oscillating a consecutive wave laser beam 16, and an optical system 15.

As shown in FIG. 3 and FIG. 4, the optical system 15 may include a module plate 37 rotatably installed and configured to determine an angle of a laser beam irradiation line in a width direction of the steel plate, a driver 36 for rotating the module plate 37, a header 39 installed on the module plate 37 and configured to emit a laser beam applied from the laser oscillator 14 into the optical system 15, a polygon mirror 32 rotatably installed on the module plate 37 and configured to reflect a laser beam emitted from the header 39, a rotation motor 33 for driving rotation of the polygon mirror 32, a condensing mirror 35 installed on the module plate 37 and configured to reflect a laser beam 16 reflected by the polygon mirror 32 toward the steel plate and to condense the laser beam 16 to the steel plate, a driving motor 34 connected to the condensing mirror 35 and configured to move the condensing mirror 35 to adjust a focal distance of the laser beam, and a shutter 38 installed on the module plate 37 and configured to selectively block the module plate 37 according to whether a laser beam is irradiated.

The optical system 15 may configure one body by disposing the header 39, the polygon mirror 32, the condensing mirror 35, and the shutter 38 in the module plate 37 configuring an optical box. The laser oscillator 14 and the header 39 may be connected to each other via, for example, an optical cable 41. Thus, a laser beam emitted from the laser oscillator 14 may be transmitted to the header 39 through the optical cable 41. The header 39, the polygon mirror 32, and the condensing mirror 35 may be disposed at appropriate positions to reflect the laser beam 16 at a desired position within the module plate 37 configuring the optical box. As shown in FIG. 3, for example, the headers 39 may be disposed at opposite sides across the polygon mirror 32 to emit a laser beam to toward the polygon mirror 32. The two the condensing lenses 35 may be disposed to correspond to each laser beam reflected by the polygon mirror 32. The laser beam emitted from the header 39 may be reflected by the polygon mirror 32 that is rotated according to driving of the rotation motor 33 and may be transmitted to the condensing mirror 35. The laser beam 16 reflected to the condensing mirror 35 may be reflected toward the steel plate from the condensing mirror 35 through the shutter 38 and may be condensed on the steel plate 1 surface. Thus, a laser beam may be periodically irradiated to the surface of the steel plate to form consecutive grooves in a width direction.

An overall focal distance of the laser beam 16 by the optical system 15 may be adjusted by moving the steel plate support roll 9 in up and down directions and mismatch of focal points at right and left sides may be adjusted by the driving motor 34 connected to the condensing mirror 35.

The shutter 38 may be installed below the module plate 37 to close and open the module plate 37. The shutter 38 may be open to prevent interference with a laser beam when the laser beam is emitted downward from the condensing mirror 35 and may be closed to prevent external fume or impurities from being introduced into the optical system 15 when the laser beam is not emitted.

When a zigzag degree of the steel plate is excessive, the steel plate deviates from the laser beam irradiation position, a laser beam may be irradiated to damage the steel plate support roll 9. Thus, to prevent the steel plate support roll 9 from being damaged, the laser oscillator controller 13 may control the laser oscillator in an on state under a normal working condition and may control the laser oscillator in an off state when a zigzag degree is equal to or greater than 15 mm.

The laser oscillator 14 may oscillate a single mode consecutive wave laser beam and transmit the laser beam to the optical system 15. The optical system 15 may irradiate the transmitted laser beam 16 to the surface of the steel plate.

The laser oscillator 14 and the optical system 15 may irradiate a laser beam to the surface of the steel plate to form a groove having an upper width within 70 μm, a lower width within 10 μm, and a depth of 3 to 30 μm and, simultaneously, may transfer laser beam energy density in the range of 1.0 to 5.0 J/mm$^2$ required to melt a steel plate to the steel plate to produce a re-solidified portion accumulating on an internal wall of the groove of a melted portion during laser beam irradiation.

The optical system 15 may have a function for controlling laser scanning speed to adjust an interval between laser beam irradiation lines 31 (refer to FIG. 2) to 2 to 30 mm in a rolling direction. Thus, influence of a heat affected zone (HAZ) due to a laser beam may be minimized to improve iron loss characteristics of the steel plate.

The laser beam irradiation equipment may be configured to change an angle of an irradiation line of a laser beam irradiated to the surface of the steel plate in a width direction of the steel plate. According to the present exemplary embodiment, the laser beam irradiation equipment may change an angle of an irradiation line of a laser beam irradiated to the surface of the steel plate in a width direction of the steel plate to a range of ±4°.

To this end, the laser beam irradiation equipment may be configured in such a way that the optical system 15 for irradiating a laser beam to the steel plate is rotatable by the driver 36 to change an angle of an irradiation line of the laser beam formed on the surface of the steel plate in the width direction of the steel plate. As such, the angle of the irradiation line of the laser beam by an optical system may be changed and, thus, an irradiation line 31 of a laser beam may be formed to be inclined by a range of ±4° in a direction perpendicular to a rolling direction of the steel plate. Accordingly, degradation in magnetic flux density due to formation of a groove by a laser beam may be minimized.

According to the present exemplary embodiment, the laser beam irradiation equipment may control an irradiation position of a laser beam with respect to the steel plate 1 to prevent a back reflection phenomenon in which a laser beam irradiated to a steel plate is reflected by the steel plate and is introduced into an optical system or a laser oscillator.

To this end, as shown in FIG. 3, the laser beam irradiation equipment may be configured to irradiate a laser beam at a position spaced apart from a center of the steel plate support roll 9 from a reference point P, which is determined as a laser beam irradiation position when an irradiation direction of a laser beam irradiated from the optical system 15 passes through a center axis of the steel plate support roll 9 with respect to the surface of the steel plate that is transferred to contact the surface of the steel plate support roll 9 in a circular arc form, along an external circumferential surface at a predetermined angle (hereinafter, referred to as a spacing angle R for convenience of description).

The reference point P may be an intersection point between the steel plate and a line that passes through a central axis of the steel plate support roll 9 in FIG. 4. When an irradiation direction of a laser beam passes through the central axis of the steel plate support roll 9, a focal point of the laser beam is matched with the reference point P. In this case, as an irradiation direction of a laser beam forms a right angle with a tangential line of the steel plate support roll 9 at the reference point P, a back reflection phenomenon in which a laser beam reflected by the steel plate is introduced into an optical system and a laser oscillator to damage the optical system and the laser oscillator may occur.

According to the present exemplary embodiment, as described above, a laser beam may be irradiated at a point spaced apart from the reference point P at the spacing angle R and, thus, a laser beam re-reflected by the steel plate may not be incident on the optical system. Accordingly, the above back reflection phenomenon may be prevented and the quality of a groove shape formed by a laser beam may be maintained.

According to the present exemplary embodiment, the spacing angle R may be set to the range of 3 to 7° along an external circumferential surface at a center of the steel plate support roll 9 with respect to the reference point P.

When the spacing angle R corresponding to a position at which the laser beam is irradiated is less than 3°, a portion of a laser beam re-reflected by the steel plate may be introduced into the optical system or the laser oscillator. When the spacing angle R is greater than 7°, a groove is not appropriately formed by a laser beam and an error in terms of formation of the groove may occur.

As such, the laser beam irradiation equipment according to the present exemplary embodiment may irradiate a laser beam to a steel plate at a point spaced apart from the reference point P at a predetermined angle and, thus, a back reflection phenomenon may be prevented and an incident path during reflection of a laser beam may not be interfered, thereby stably maintaining the quality of a groove shape formed by the laser beam.

In addition, a reflected light beam reflected at a laser beam irradiation position may be emitted around an opening 37A of an optical system but the absorption portion included in the optical system according to the present exemplary embodiment may absorb and remove radiant heat due to reflection of the laser beam to prevent the optical system from being damaged.

FIGS. 4 to 6 illustrate a structure of an absorption portion installed below an optical system according to the present exemplary embodiment. Hereinafter, with reference to FIGS. 4 to 6, the absorption portion is described.

The absorption portion may be installed below the optical system 15 and may include a cooling block 70 that absorbs radiant heat of a laser reflected by the steel plate. The cooling block 70 may be installed below an optical system of the laser beam irradiation equipment to correspond to a position at which a laser beam reflected by the steel plate 1 is reflected. The cooling block 70 may absorb radiant heat of the reflected laser via heat exchange.

The cooling block 70 may be installed below the optical system along a surrounding portion of the opening 37A through which a laser beam is transmitted. The laser beam irradiated to the steel plate 1 through the opening 37A below the optical system 15 may be irradiated to be spaced apart from the reference point P at the spacing angle R as described above and, thus, may be reflected around the opening 37A out of the incident path. Accordingly, the cooling block 70 is installed around the opening 37A below the optical system and, thus, radiant heat of a laser reflected by the optical system may be effectively absorbed and removed.

The cooling block 70 may be formed of a copper or aluminum material with thermal conductivity to easily absorb radiant heat. The cooling block 70 may be manufactured as a single structure. Accordingly, in a permanent magnetic domain refining process configured as an inline process, an operation installing the cooling block 70 with respect to the optical system 15 or separating the cooling block 70 from the optical system 15 may be easily performed and a repair time may be minimized.

As shown in FIGS. 4 and 5, the cooling block 70 may be inclined in such a way that a front surface 71 to which a reflected light beam of a laser beam is irradiated faces toward an irradiation direction of the reflected light beam. Thus, the reflected light beam is irradiated directly to the front surface 71 of the cooling block 70 to enhance absorption efficiency of radiant heat.

The cooling block 70 may have a chemical vapor coating layer formed on a surface thereof to prevent scattered melted iron from being attached to the surface.

Melted iron such as spatter that is locally formed on a steel plate by a laser beam irradiated to the steel plate may have constant grain-oriented characteristics and, particularly, there is high possibility that the melted iron is scattered in a direction in which the steel plate is transferred and processed to be fused to the cooling block 70. As the scattered melted iron is attached to a surface of the cooling block 70 to form a layer and is gradually grown, a lump of melted iron may contact the steel plate to scratch the steel plate.

Thus, the cooling block 70 according to the present exemplary embodiment may have a chemical vapor coating layer formed on a surface thereof, thereby preventing scattered melted iron at high temperature from being attached to the surface of the cooling block 70. When the chemical vapor coating layer is not formed, alloying occurs via attachment or dissolution of melted iron at high temperature and, thus, the cooling block may be damaged by heat crack or a lifetime thereof may be reduced.

The chemical vapor coating layer may be formed by coating alumina or the like on a surface of the cooling block. Thus, the cooling block may ensure oxidation resistant and slag difficult attachment characteristics at high temperature. The chemical vapor coating layer may prevent melted iron from being attached and may maintain a reformed state of a surface of the cooling block 70 for a long time and, thus, exchanging and repairing periods of the cooling block 70 may be increased by 90% or greater compared with the prior art.

The cooling block 70 may be configured in such a way that a coolant circulates therein to prevent the cooling block 70 from being heated by radiant heat and to maintain a cooling state, thereby enhancing absorption efficiency of radiant heat.

To this end, the absorption portion according to the present exemplary embodiment may further include a cooling path 72 formed in the cooling block 70, and a supply portion that circulates and supplies a coolant to the cooling block 70 through a supply pipe connected to the cooling path 72. The coolant may be, for example, cooling water and may be any coolant as long as the coolant is a heat exchangeable fluid without being particularly limited.

As shown in FIG. 6, the cooling path 72 may be formed in a zigzag form along an internal part of the cooling block 70 and, thus, a coolant may uniformly cool the front surface 71 while uniformly passing through an entire portion of the cooling block 70. In FIG. 6, arrows indicate a direction in which a coolant flows.

The cooling block 70 may also be configured as a very thin plate in consideration of a narrow interval between the optical system 15 and the steel plate 1 and, thus, it may be very difficult to form the cooling path 72 in the cooling block 70 and to connect the cooling paths 72 to each other.

Accordingly, according to the present exemplary embodiment, the cooling path 72 may include a plurality of paths 73 and 74 that are straightly formed through an external surface of the cooling block 70, and a plug or ball 75 that blocks a path in the path to connect paths in one direction at an intersection between the paths may be installed and may be formed in a zigzag form.

That is, straight paths may be formed on a lateral surface and an upper or front surface of the cooling block 70, respectively. For example, the path 73 that is formed on a lateral surface of the cooling block 70 in a horizontal direction and the path 74 that is formed on an upper surface of the cooling block 70 in a vertical direction may cross each other in a perpendicular direction. An intersection portion in which the path 73 in the horizontal direction and the path 74 in the vertical direction perpendicularly cross each other may be a portion in which a direction of the cooling path 72 is changed. The plug or circular ball 75 may be inserted into the cooling block 70 through the path 73 in the horizontal direction, which penetrates into a lateral surface of the cooling block 70, or the path 74 in the vertical direction, which penetrates into an upper surface of the cooling block 70. The plug or ball 75 may be a structure that has a size corresponding to a diameter of a path and blocks the path and may be inserted at an appropriate position in the path to block the path.

The appropriate position in the paths 73 and 74 may refer to a portion that needs to be blocked except for a path required to form the cooling path 72 in a zigzag form in one direction in the cooling block 70. As shown in FIG. 6, the plug or ball 75 may be positioned past the intersection between the path 73 in the horizontal direction and the path 74 in the vertical direction, in a direction in which a coolant flows. Thus, for example, the path in the horizontal direction may be blocked by the plug or the ball at the intersection and a coolant may be moved in a vertical direction. Accordingly, the coolant may be moved along the cooling path 72, formed in one direction, by the plug or the ball.

Step differences 73A and 74A with a narrowed width may be formed in the paths 73 and 74 in a direction in which a coolant is moved to prevent the plug or ball 75 from being moved by fluid pressure of the coolant flowing along the path in the paths 73 and 74. Accordingly, the plug or ball 75 may not be moved any longer by being coughed by the step differences 73A and 74A and may be fixed at the current position.

In addition, a separate plug 76 may be installed and may block a portion that is processed and penetrates through a lateral or front surface of the cooling block 70 to form the path, thereby preventing the coolant from leaking out.

Accordingly, according to the present exemplary embodiment, the plug 76 may be fixedly installed by cogging 77 of the cooling block 70. As shown in FIG. 7, the plug 76 may be assembled in the cooling block 70 and, then, the plug 76 may be fixedly installed by cogging 77 of the cooling block 70 to cause plastic deformation in an external circumference portion of the plug 76.

In general, a screw tightening method of performing tap processing on a plug may be mainly used as a structure for blocking a hole. However, according to the present exemplary embodiment, when surface temperature of the cooling block 70 is very high and a temperature gradient is excessively formed in an entire cooling block due to a very small interval between a steel plate and an optical system, the cooling block may be very vulnerable to heat crack. Accordingly, when a plug is assembled via the aforementioned conventional tap processing structure, micro crack may be generated and grown on a tap processing portion and, thus, heat crack may be generated and the possibility in terms of water leak may be increased.

Accordingly, according to the present exemplary embodiment, the plug 76 may be fixedly installed by cogging 77 of the cooling block 70 without tap processing and, thus, heat crack may be prevented with respect to high heat and a temperature gradient, thereby reducing the possibility in terms of water leak.

FIG. 8 is a diagram showing a structure of the supply portion.

As shown in FIG. 8, the supply portion may include a heat exchanger 79 installed on a coolant circulation line 78 to cool a coolant passed through the cooling block 70, a supply pump 80 for supplying the coolant passed through the heat exchanger to the cooling block 70, a flow switch 81 for detecting a fed flow rate of a coolant introduced into the cooling block 70 along a circulation line according to driving of the supply pump, and a control circuit 82 for control of driving of the laser oscillator of the optical system based on a detected value of the flow switch.

The supply portion may further include a thermostatic bath 83 installed on the circulation line 78 to accommodate a coolant cooled through the heat exchanger 79 and to maintain temperature of the coolant.

At least two supply pumps 80 of the supply portion may be installed at a rear end of thermostatic bath 83 and may be disposed in parallel to each other on the circulation line 78. Accordingly, when the supply pump at one side malfunctions, the other supply pump may be driven to continuously circulate and supply the coolant.

An appropriate flow rate of the coolant supplied to the cooling block 70 may not be supplied to the cooling block 70 due to clogging of the cooling path by impurities, water leak, malfunction of a supply pump, and so on. When an appropriate flow rate of a coolant is not supplied to the cooling block 70, an optical system sensitive to temperature may deteriorate, aberration may be generated, and a focal point may be changed and, thus, a degree of magnetic domain refinement may not be uniform and the quality of magnetic domain refinement may deteriorate.

Accordingly, according to the present exemplary embodiment, the supply portion may be configured to always monitor whether a coolant of an appropriate flow rate is supplied and to configure an interlock with a laser oscillator controller as described above and, thus, when the cooling block 70 malfunctions, a laser beam irradiation operation may be stopped to protect an optical system and to prevent the quality of the steel plate from being degraded.

Impurities may be removed from a coolant output from the supply pump 80 while the coolant passes through a filter 84 installed on the coolant circulation line 78 and pressure of the coolant may be reduced through a pressure reducing valve 85 prior to the cooling block 70 and, then, the coolant may be branched through a distribution header 86 and may be distributed and supplied to a plurality of the cooling block 70.

Flow switches 81 may be separately installed for each cooling block 70 in lines branched from the distribution header 86, respectively and, thus, flow speed or greater or flow rate or greater of the coolant supplied to each cooling block 70 may be detected.

According to a detection signal of the flow switch 81, the control circuit 82 may be driven and, thus, laser oscillator controller 13 (refer to FIG. 1) may turn off driving of the laser oscillator 14 (refer to FIG. 1). That is, when flow rate or flow speed of a coolant supplied to the cooling block 70 is lower than a reference value to cause abnormality, the flow switch 81 may output an abnormality signal and the control circuit 82 may supply a signal to the laser oscillator controller 13 according to the output signal of the flow switch 81. The laser oscillator controller 13 may block power supplied to the laser oscillator 14 according to the abnormality signal of the control circuit 82 to stop driving of the laser oscillator. Thus, when a coolant is not appropriately circulated in the cooling block 70 and radiant heat of a reflected light beam is not smoothly absorbed and removed, the laser oscillator may not be operated. Accordingly, the optical system may be prevented from deteriorating and being deformed and an irradiation state of a laser beam may be stably maintained and, thus, an irradiation line may be stably formed in the surface of the steel plate to a constant groove depth.

The laser beam irradiation equipment may further include melted iron removal equipment for removing fume and spatter that are generated via irradiation of a laser beam to the steel plate.

The melted iron removal equipment may include an air knife 17 for spraying compressed dry air into a groove of the steel plate to remove melted iron remaining in the groove and dust collection hoods 19A and 19B for absorbing and removing fume and melted iron. Fume generated during laser beam irradiation may be removed through the air knife or the dust collection hood to be prevented from being introduced into the optical system. The air knife 17 may spray compressed dry air with predetermined amplitude of pressure Pa into a groove of the steel plate 1 to remove melted iron remaining in the groove. The compressed dry air in the air knife 17 may have pressure Pa equal to or greater than $0.2$ $kg/cm^2$. This is because, when pressure of the compressed dry air is less than $0.2$ $kg/cm^2$, it is not possible to ensure an effect of improving iron loss characteristics. Fume and spatter partially removed by the air knife may be removed by the dust collection hoods 19A and 19B that are disposed after and before the laser beam irradiation position, respectively.

The laser beam irradiation equipment may further include a shield 18 for preventing reflected light, scattered light, and radiant heat of a laser beam from being introduced into the optical system. The shield 18 may block reflected light and scattered light introduced into the optical system via reflection and scattering of the laser beam 16 irradiated to the steel plate, thereby preventing the optical system from being heated and thermally deformed by radiant heat due to reflected light beam and scattered light.

The laser room 20 may be a room structure with an internal space, may accommodate the laser beam irradiation equipment and position control equipment of the steel plate support roll 9 therein to be isolated from the outside, and may provide an appropriate operation environment for smooth driving of the laser beam irradiation equipment and the position control equipment of the steel plate support roll 9.

An inlet and an outlet may be formed at entry and exit sides of the laser room 20 based on a transferred direction of the steel plate. The laser room 20 may include equipment for blocking introduction of a pollutant to prevent the internal space from being contaminated by external dust or the like. To this end, the laser room 20 may include an over pressure device 23 for increasing internal pressure compared with external pressure. The over pressure device 23 may maintain the pressure inside the laser room 20 higher than the outside pressure. Accordingly, the external impurities may be prevented from being introduced into the laser room 20. Air curtains 22A, 22B, 22C, and 22D may be installed at the inlet and the outlet through which the steel plate is input and output. The air curtains may spray air to form a film at the inlet and the output of paths through which the steel plate is input and output to and from the laser room 20, thereby preventing dust or the like from being introduced through the inlet and the outlet. To prevent the internal space of the laser room 20 from being contaminated, a shower booth 21 may be installed at a door as an entrance of the laser room 20. The shower booth 21 may remove impurities on a visitor that enters the laser room 20.

A steel plate magnetic domain refinement procedure using a laser beam may be substantially transferred in the laser room 20 and, thus, it may be required to minimize a change in internal environment and to maintain an appropriate environment. To this end, the laser room 20 may include an optical system lower frame 24 for separating an upper space in which the laser oscillator 14, the optical system 15, and so on of the laser beam irradiation equipment are positioned, from a lower space through which the steel plate 1 is passed, and an isothermal-isohumidity controller 25 for controlling temperature and humidity inside the laser room 20.

The optical system lower frame 24 may more rigorously manage an operation environment of main equipment such as the laser oscillator 14 and the optical system 15. The optical system lower frame 24 may be installed to separate an optical system lower space through which the steel plate is passed and an optical system upper space in which a laser oscillator and optical system mirrors are positioned in the laser room 20. The optical system upper space may also be separated in the laser room 20 by the optical system lower frame 24 and, thus, it may easily prevent main equipment such as a laser oscillator or an optical system from being contaminated and easily control temperature and humidity.

The isothermal-isohumidity controller 25 may adjust temperature and humidity in the laser room 20 to provide an appropriate environment. According to the present exemplary embodiment, the isothermal-isohumidity controller 25 may maintain internal temperature of the laser room 20 to 20 to $25°$ C. and may maintain humidity to 50% or less.

As such, appropriate temperature and humidity to a working environment may be continuously maintained in the internal space of the laser room 20 and, thus, a magnetic domain refinement may be performed on the steel plate in an optimum state. Accordingly, high-quality products may be massively produced in an optimum operation environment required for a process.

According to the present exemplary embodiment, a magnetic domain refinement device may further include post-processing equipment for removing hill up and spatter formed on the surface of the steel plate.

The hill up and the spatter may reduce insulation and a space factor of products and, thus, the hill up and the spatter may be completely removed by the post-processing equipment to enhance the quality of products.

The post-processing equipment may include brush rolls 26A and 26B that are disposed at a rear end of the laser room 20 in a transferring direction of the steel plate to remove hill up and spatter of the surface of the steel plate. The brush rolls 26A and 26B may be rotated at high speed by a driving motor and, in this regard, rotation speed and an interval from the steel plate may be controlled by a current control system for controlling a current value of the driving motor, generated during an operation, to a predetermined target value, and a brush position control system for adjusting and controlling an interval between the brush roll and the steel plate. The brush roll may be disposed only on one surface of the steel plate, in which a groove is formed via a laser beam, or may be disposed on opposite surfaces of the steel plate. The brush rolls 26A and 26B may move hill up and spatter attached on the steel plate as the brush rolls 26A and 26B are closely positioned on the surface of the steel plate and rotate at high speed. As shown in FIG. 1, a dust collection hood 19C for discharging the hill up and spatter removed by the brush roll may be further installed adjacently to the brush rolls 26A and 26B. The dust collection hood 19C may absorb and externally discharge melted iron such as hill up and spatter removed from the steel plate by the brush rolls 26A and 26B.

The post-processing equipment may further include a cleaning unit 29 disposed at a rear end of the brush rolls 26A and 26B to additionally removing the hill up and spatter remaining on the surface of the steel plate via electrolysis reaction between the steel plate and a filter unit 30 connected to the cleaning unit to filter impurities included in an alkaline solution of the cleaning unit from the alkaline solution.

The steel plate may primarily remove hill up and spatter through the brush rolls 26A and 26B and may secondarily remove the remaining hill up and spatter through the cleaning unit 29. Thus, the hill up and spatter attached on the surface of the steel plate may be completely removed to enhance product quality.

The cleaning unit 29 may be filled with an alkaline solution therein and may have one side connected to the filter unit 30. As the steel plate is processed through the cleaning unit, the hill up and spatter removed from the steel plate may accumulate in the internal alkaline solution, thereby degrading cleaning performance of the steel plate. The filter unit 30 may remove hill up and spatter included in the alkaline solution as the alkaline solution of the cleaning unit is circulated. The filter unit 30 may remove hill up and spatter to manage content of iron of the alkaline solution to be equal to or less than 500 ppm. As such, cleaning performance of the cleaning unit may be prevented from deteriorating and, thus, the steel plate may be continuously processed.

Hereinafter, a magnetic domain refinement procedure of an electrical steel plate according to the present exemplary embodiment is described.

A continuously transferred steel plate may introduced into a laser room through the zigzag control equipment and the tension control equipment, may be transferred at speed equal to or greater than 2 m/sec, and may be magnetic-domain refinement processed. The steel plate introduced into the laser room may be magnetic-domain refinement processed through the laser beam irradiation equipment and, then, may be transferred out of the laser room. The hill up, spatter, and so on, which remain on the surface of the steel plate, may be removed from the steel plate transferred out of the laser room through the post-processing equipment and, then, the steel plate may be transferred to a subsequent procedure.

During this procedure, the laser room in which laser beam irradiation is performed on the surface of the steel plate may be configured to appropriately set and maintain an internal operation environment to provide an optimum environment for magnetic domain refinement.

The laser room may be configured to isolate an internal portion from the outside to prevent external pollutant from being introduced and may control temperature, pressure, and humidity inside the laser room according to an operating environment for formation of magnetic-domain refinement.

The laser room may be configured and maintained at high internal pressure compared with external pressure to prevent pollutants such as external dust from being introduced into the laser room. A film may be formed by air at an inlet and an outlet of a path for transferring the steel plate and, thus, pollutants such as dust may be prevented from being introduced into the laser room during a procedure in which the steel plate is transferred through the inlet and the outlet.

The isothermal-isohumidity controller installed in the laser room may be maintained at temperature inside the laser room of 20 to 25° C. and humidity equal to or less than 50% and, thus, may provide an optimum condition for processing magnetic-domain refinement via laser beam irradiation.

As such, an optimum environment for laser beam irradiation may be provided by the laser room, and the steel plate may be accurately positioned at a laser beam irradiation position through the zigzag control equipment, the tension control equipment, and the steel plate support roll position adjusting equipment.

First, for the magnetic domain refinement processing, the steel plate may be controlled in a transferred direction through the zigzag control equipment to be straightly transferred without being inclined in right and left directions along a production line center.

The zigzag measuring sensor may continuously detect a zigzag degree of the steel plate and, when the steel plate zigzags, the signal detected by the zigzag measuring sensor may be calculated and the strip center position control system may rotate and move a shaft of a steering roll to transfer the steel plate to a home position. As such, the steering roll may be continuously controlled according to a position of the steel plate and, thus, the steel plate may be continuously transferred without deviating from the production line center.

The steel plate may be transferred through a tension bridle roll for tension adjustment through the steering roll. Tension of the steel plate passed through the tension bridle roll may be detected by the tension measuring sensor. The strip tension control system may calculate a measurement value detected by the tension measuring sensor and may control speed of the tension bridle roll according to predetermined tension. Accordingly, tension of the transferred steel plate may be continuously maintained within a predetermined range.

The steel plate passed through the tension bridle roll may be introduced into the laser room through an inlet of the laser room. The steel plate may be changed in direction thereof by the deflector roll in the laser room and may be transferred in a state in which the steel plate is closely positioned to the steel plate support roll positioned between the two deflector rolls.

The steel plate support roll may transfer the steel plate in up and down directions to position a laser beam within a depth of focus of a laser beam.

When a laser beam is irradiated to the steel plate from the laser beam irradiation equipment, the brightness measuring sensor may detect brightness of flame of the surface of the steel plate in real time, and an SRP position control system may move the steel plate support roll in up and down directions to position a laser beam in a depth of focus of the laser beam according to the measurement value detected by the brightness measuring sensor. Accordingly, a laser beam may be effectively irradiated to the surface of the steel plate to form a light irradiation line with high quality.

The laser oscillator controller may turn on/off the laser oscillator according to a zigzag degree of the steel plate. The laser oscillator controller may be connected to the zigzag measuring sensor and, when a zigzag degree of the steel plate, measured by the zigzag measuring sensor, is equal to or greater than, for example, 15 mm, the laser oscillator controller may determine that the steel plate much deviates from the steel plate support roll and may turn off the laser oscillator. Thus, a laser beam may be irradiated to the surface of the steel plate support roll through the zigzagging steel plate to prevent the roll from being damaged.

According to a command of the laser oscillator controller, a laser beam generated by the laser oscillator may be irradiated to the surface of the steel plate through an optical system. The laser oscillator may oscillate a TEM00 consecutive wave laser beam and may transmit the beam to the optical system.

The optical system may convert a direction of a laser beam to irradiate a laser beam to the surface of the steel plate and, thus, may consecutively form a melted groove in the surface of the steel plate to perform magnetic domain refinement processing.

As the surface of the steel plate may be melted by a laser beam irradiated to the steel plate through the optical system, a melted groove may be formed along a light irradiation line. According to the present exemplary embodiment, a groove having an upper width within 70 µm, a lower width within 10 µm, and a depth of 3 to 30 µm may be formed in the surface of the steel plate via laser beam irradiation and, simultaneously, laser beam energy density in the range of 1.0 to 5.0 J/mm$^2$ required to melt a steel plate may be transferred to the steel plate to produce a re-solidified portion accumulating on an internal wall of the groove of a melted portion during laser beam irradiation.

A laser beam may be irradiated to a position spaced apart from a reference point through an optical system during a laser beam irradiation procedure and, thus, a laser beam that is re-reflected by the steel plate may not be incident on the optical system. Accordingly, the above back reflection phenomenon may be prevented and an incident path of a laser beam may not be interfered by the reflected light beam and, thus, the quality of a shape of a groove formed by a laser beam may be maintained.

According to the present exemplary embodiment, during a laser beam irradiation procedure, radiant heat of a reflected light beam that is reflected by the surface of the steel plate may be absorbed and removed to prevent the optical system from deteriorating.

The reflected light beam that is reflected by the steel plate may be irradiated to the cooling block installed below the optical system, and the cooling block may exchange heat with the radiant heat of the reflected light beam in a state in which the cooling block is cooled by a coolant flowing therein to absorb and remove the radiant heat. The coolant may be circulated in the cooling block to maintain the cooling block at cooling temperature.

As such, radiant heat of the reflected light beam that is reflected by the optical system may be absorbed and removed to prevent the optical system from being heated.

According to the present exemplary embodiment, during the above procedure of absorbing and removing of radiant heat of a reflected light beam, a flow rate of a coolant supplied to the cooling block may be detected and driving of the laser oscillator may be controlled when a fed flow rate of the coolant is abnormal. Accordingly, when the coolant is not supplied at an appropriate flow rate, driving of the laser oscillator may be immediately stopped to protect the optical system and to prevent the quality of the steel plate from deteriorating.

The optical system may have a function of controlling laser scanning speed to adjust in interval of a laser beam irradiation line with respect to a rolling direction. The optical system may include a rotation function to change an angle of a laser beam irradiation line. According to the present exemplary embodiment, the optical system may adjust a laser beam irradiation line interval to 2 to 30 mm in a rolling direction to minimize influence of a heat affected zone (HAZ) due to a laser beam and to improve iron loss characteristics of the steel plate. During the laser beam irradiation procedure, an angle of a light irradiation line of a laser beam irradiated to the surface of the steel plate may be changed via rotation of the optical system. According to the present exemplary embodiment, the optical system may change the angle of the light irradiation line of the laser beam to a range of ±4° with respect to a width direction of the steel plate. That is, in FIG. 2, the irradiation line 31 of the laser beam may be formed to be inclined in a range of ±4° with respect to the y-axis direction. Accordingly, the light irradiation line formed in the surface of the steel plate may be formed to be inclined in a range of 86 to 94° with respect to a rolling direction. As such, the irradiation line may be formed to be inclined with respect to the y-axis direction, thereby minimizing degradation in magnetic flux density due to formation of a groove by a laser beam.

During the laser beam irradiation procedure, as the steel plate is melted by a laser beam, a large amount of fume and spatter as melted iron may be generated. When fume and spatter contaminate the optical system and melted iron remains in the groove, it may be difficult to accurately form a groove and iron loss characteristics may not be improved and, thus, the quality of products may be degraded. Accordingly, compressed dry air may be sprayed into a groove of the steel plate to remove melted iron remaining in the groove, and fume and melted iron may be absorbed and removed through the dust collection hoods. Accordingly, during a steel plate refinement procedure, fume may be prevented from being introduced into the optical system and fume and spatter may be rapidly removed, thereby enhancing magnetic-domain refinement processing efficiency. During the laser beam irradiation procedure, scattered light and heat of a laser beam may be prevented from being further introduced into the optical system of the laser beam irradiation equipment.

Magnetic domain refinement processing may be performed while a groove is formed in the surface of the steel plate via laser beam irradiation, and the magnetic-domain refinement processed steel plate may be continuously transferred and may be externally discharged through an outlet of the laser room.

A procedure of removing hill up and spatter attached on the surface of the steel plate may be performed on the steel plate discharged out of the laser room after the post-processing procedure is performed.

The steel plate may be closely positioned on the steel plate to primarily remove hill up and spatter from the steel plate by the brush roll that rotates at high speed while the steel plate is passed through the brush roll disposed outside the laser room.

The remaining hill up and spatter may be lastly removed via electrolysis reaction between the steel plate and an alkaline solution from the steel plate passed through the brush roll while the steel plate is secondarily passed through the cleaning unit. The steel plate that is passed through the cleaning unit and from which hill up and spatter are removed may be transferred to a subsequent procedure.

TABLE 1

| Iron loss improvement rate (%) | |
| --- | --- |
| After irradiation of laser | After heat treatment |
| 9.5 | 11.6 |
| 9.7 | 12.9 |
| 11.5 | 13.5 |
| 8.4 | 11.6 |
| 8.6 | 11.8 |
| 8.5 | 11.7 |

Table 1 above shows an iron loss improvement rate of a grain-oriented electrical steel plate by a groove formed in the surface of the steel plate with a thickness of 0.27 mm via consecutive wave laser beam irradiation according to an embodiment of the present invention. As seen from Table 1 above, according to the present exemplary embodiment, the magnetic-domain refinement processed steel plate may have improved iron loss characteristics both after laser beam irradiation is performed and after magnetic domain refinement using a laser beam and heat treatment are performed.

While this invention has been described in connection with what is presently considered to be practical exemplary embodiments, various modifications and embodiments are implemented by one of ordinary skill in the art. It is to be understood that the invention is not limited to the disclosed embodiments and does not exceed the spirit and scope of the appended claims.

The invention claimed is:

1. A device for refining a magnetic domain of a grain-oriented electrical steel plate, comprising:
   steel plate support roll position adjusting equipment configured to control a position of the steel plate in up and down directions while supporting the steel plate transferred in a production line;
   laser beam irradiation equipment configured to irradiate a laser beam to a surface of the steel plate to melt the steel plate to form a groove in the surface of the steel plate; and
   an absorption portion configured to absorb and remove radiant heat due to reflection of the laser beam irradiated to the surface of the steel plate from the laser beam irradiation equipment,
   wherein the laser beam irradiation equipment irradiates the laser beam at a position spaced apart from a reference point along an external circumferential surface at predetermined angle with respect to the surface of the steel plate transferred to contact the surface of the steel plate support roll in a circular arc form,
   wherein the reference point is determined as an intersection point between the steel plate and a line that passes through a central axis of the steel plate support roll, and wherein the predetermined angle is in a range of 3 to 7°.

2. The device of claim 1, further comprising a laser room configured to isolate the steel plate support roll position adjusting equipment and the laser beam irradiation equipment from the outside to provide an operation environment for laser beam irradiation.

3. The device of claim 2, wherein:
   the laser room includes:
   an over pressure device configured to accommodate the laser beam irradiation equipment and the steel plate support roll position control equipment to form an internal space to be isolated from the outside, including an inlet and an output at opposite sides in a transferred direction of the steel plate, and formed therein to increase internal pressure of the laser room compared with external pressure;
   an optical system lower frame configured to separate an upper space in which an optical system of the laser beam irradiation equipment is positioned from a lower space through which the steel plate is passed; and
   an isothermal-isohumidity controller configured to control temperature and humidity inside the laser room.

4. The device of claim 1, wherein the optical system is configured to be rotatable by a driver and to be rotated with respect to the steel plate to change an irradiation angle of the laser beam in a width direction of the steel plate.

5. The device of claim 1, wherein:
   the absorption portion includes a cooling block installed below an optical system of the laser beam irradiation equipment corresponding to a reflected position of the laser beam reflected by the steel plate and configured to absorb radiant heat of a reflected laser beam via heat exchange.

6. The device of claim 5, wherein:
   the absorption portion further includes a cooling path formed in the cooling block and a supply portion configured to circulate and supply the coolant to the cooling block through a supply pipe connected to the cooling path.

7. The device of claim 6, wherein the supply portion includes a heat exchanger installed on a coolant circulation line, a supply pump configured to supply the coolant passed through the heat exchanger, a flow switch configured to detect a fed flow rate of the coolant introduced into the cooling block along a circulation line according to driving of the supply pump, and a control circuit configured to control driving of the laser oscillator of the optical system based on a detected value of the flow switch.

8. The device of claim 6, wherein: the cooling block forms a chemical vapor coating layer to prevent scattered melted iron from being attached to the surface.

9. The device of claim 6, wherein:
   the cooling path of the cooling block includes a plurality of paths formed in a straight line through an external surface of the cooling block, and a plug configured to block a path in the path to connect the paths in one direction at an intersection between the paths and formed in a zigzag form.

10. The device of claim 9, wherein: the plug is fixedly installed to the cooling block via cogging of the cooling block.

* * * * *